United States Patent
Cunningham et al.

(10) Patent No.: US 7,716,535 B2
(45) Date of Patent: May 11, 2010

(54) KALMAN FILTERING FOR GRID COMPUTING TELEMETRY AND WORKLOAD MANAGEMENT

(75) Inventors: Helen Ann Cunningham, Los Altos Hills, CA (US); Jeffrey Scott Demoff, Littleton, CO (US); Alan Scott Wolff, Louisville, CO (US)

(73) Assignee: Oracle America, Inc., Redwood Shores, CA (US)

( * ) Notice: Subject to any disclaimer, the term of this patent is extended or adjusted under 35 U.S.C. 154(b) by 663 days.

(21) Appl. No.: 11/450,723

(22) Filed: Jun. 8, 2006

(65) Prior Publication Data

US 2007/0288626 A1 Dec. 13, 2007

(51) Int. Cl.
*G06F 11/00* (2006.01)
(52) U.S. Cl. ...................................... 714/48
(58) Field of Classification Search ................ 714/48
See application file for complete search history.

(56) References Cited

U.S. PATENT DOCUMENTS

| | | | |
|---|---|---|---|
| 5,105,372 A * | 4/1992 | Provost et al. ............ 702/185 |
| 6,636,987 B1 * | 10/2003 | Ruffini ........................ 714/12 |
| 7,243,265 B1 * | 7/2007 | Wookey et al. ............... 714/37 |
| 2002/0091972 A1 * | 7/2002 | Harris et al. ................. 714/47 |
| 2004/0199833 A1 * | 10/2004 | Brodie ........................ 714/48 |
| 2005/0091642 A1 * | 4/2005 | Miller ........................ 717/124 |
| 2006/0167784 A1 * | 7/2006 | Hoffberg ..................... 705/37 |
| 2007/0067678 A1 * | 3/2007 | Hosek et al. ................. 714/25 |
| 2007/0118346 A1 * | 5/2007 | Wen et al. .................... 703/10 |
| 2007/0240161 A1 * | 10/2007 | Prabhakar et al. .......... 718/104 |

* cited by examiner

*Primary Examiner*—Nadeem Iqbal
(74) *Attorney, Agent, or Firm*—Brooks Kushman P.C.

(57) ABSTRACT

In one embodiment, a method and apparatus for Kalman filtering for grid computing telemetry and workload management is disclosed. The method includes monitoring telemetry data at a node of a grid computing engine with a Kalman filter, determining whether the monitored telemetry data is outside of a bounds of a predictive model of the Kalman filter, signaling an error condition for the node if the monitored telemetry data is outside of the bounds, and addressing the error condition by correcting a problem experienced at the node corresponding to the error condition. Other embodiments are also disclosed.

20 Claims, 5 Drawing Sheets

KALMAN FILTERING FOR GRID COMPUTING TELEMETRY AND WORKLOAD MANAGEMENT

FIELD OF INVENTION

An embodiment of the invention relates to computer system telemetry, and more specifically, to Kalman filtering for grid computing telemetry and workload management.

BACKGROUND OF INVENTION

In a grid computing engine topology, a large amount of telemetry data is generated. Detecting errors indicated by the telemetry data assists in the management and control of applications in the grid engine topology. However, problems arise in the storage of large telemetry datasets. As grid engine topologies grow and additional components are added, it becomes costly, time-consuming, and inefficient to store the vast amounts of telemetry data needed for management and control of the grid engine.

Currently, systems being built in a grid computing engine topology are complex and it is difficult to know in advance where operating challenges may arise. System management, monitoring, and troubleshooting can be unpredictable and costly, and it is becoming increasingly more difficult as systems are handling more transactions than ever before.

As a result, systems are being launched that provide programs for "autonomous" or "self-healing" computing. However, with these programs, an amount of interpretation of the different telemetry statistics produced by the systems is necessary. Furthermore, a tendency towards threshold-based monitoring occurs, which, while it allows for the filtering out of most telemetry data, has many disadvantages as well. The disadvantages include, but are not limited to, false alarms, inability to adapt to selective data, and lack of selective and accurate filtering of the telemetry data.

It would be beneficial to provide for real-time detection of error states or grid management and control applications, without the need to store large telemetry datasets.

SUMMARY OF INVENTION

The present invention includes novel methods and apparatus for Kalman filtering for grid computing telemetry and workload management.

According to one embodiment of the invention, a method is disclosed. The method includes monitoring telemetry data at a node of a grid computing engine with a Kalman filter, determining whether the monitored telemetry data is outside of a bounds of a predictive model of the Kalman filter, signaling an error condition for the node if the monitored telemetry data is outside of the bounds, and addressing the error condition by correcting a problem experienced at the node corresponding to the error condition.

According to another embodiment of the invention, an apparatus is disclosed. The apparatus includes a grid computing engine including a node and a Kalman filter associated with the node. Furthermore, the Kalman filter is to monitor telemetry data at the node, determine whether the monitored telemetry data is outside of the bounds of a predictive model of the Kalman filter, and signal an error condition for the node if the telemetry data is outside of the bounds.

BRIEF DESCRIPTION OF THE DRAWINGS

The invention may be best understood by referring to the following description and accompanying drawings that are used to illustrate embodiments of the invention. In the drawings.

DETAILED DESCRIPTION

Figure 1:
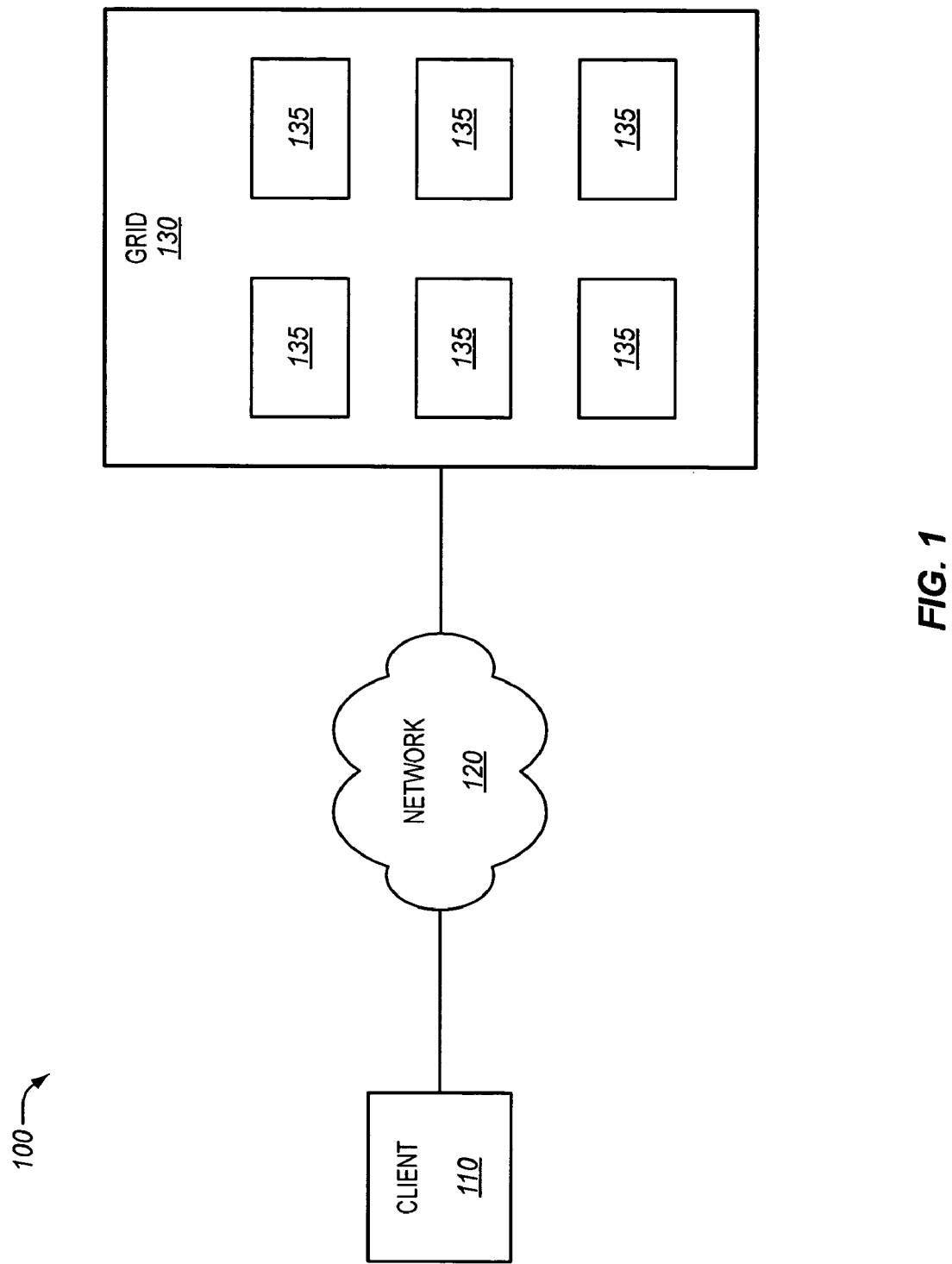
FIG. 1 is a block diagram of one embodiment of a grid computing engine topology.

A method and apparatus are described for Kalman filtering for grid computing telemetry and workload management. According to one embodiment, the method includes monitoring telemetry data at a node of a grid computing engine with a Kalman filter, determining whether the monitored telemetry data is outside of a bounds of a predictive model of the Kalman filter, signaling an error condition for the node if the monitored telemetry data is outside of the bounds, and addressing the error condition by correcting a problem experienced at the node corresponding to the error condition.

In the following description, numerous details are set forth. It will be apparent, however, to one skilled in the art that embodiments of the present invention may be practiced without these specific details. In other instances, well-known structures, devices, and techniques have not been shown in detail, in order to avoid obscuring the understanding of the description. The description is thus to be regarded as illustrative instead of limiting.

Reference in the specification to "one embodiment" or "an embodiment" means that a particular feature, structure, or characteristic described in connection with the embodiment is included in at least an embodiment of the invention. The appearances of the phrase "in one embodiment" in various places in the specification are not necessarily all referring to the same embodiment.

Also, select embodiments of the present invention include various operations, which are described herein. The operations of the embodiments of the present invention may be performed by hardware components or may be embodied in machine-executable instructions, which may be in turn utilized to cause a general-purpose or special-purpose processor, or logic circuits programmed with the instructions, to perform the operations. Alternatively, the operations may be performed by a combination of hardware and software.

Moreover, embodiments of the present invention may be provided as computer program products, which may include machine-readable medium having stored thereon instructions used to program a computer (or other electronic devices) to perform a process according to embodiments of the present invention. The machine-readable medium may include, but is not limited to, floppy diskettes, hard disk, optical disks, CD-ROMs, and magneto-optical disks, read-only memories (ROMs), random-access memories (RAMs), erasable programmable ROMs (EPROMs), electrically EPROMs (EEPROMs), magnetic or optical cards, flash memory, or other types of media or machine-readable medium suitable for storing electronic instructions and/or data. Moreover, data discussed herein may be stored in a single database, multiple databases, or otherwise in select forms (such as in a table).

Additionally, embodiments of the present invention may be downloaded as a computer program product, wherein the program may be transferred from a remote computer (e.g., a server) to a requesting computer (e.g., a client) by way of data signals embodied in a carrier wave or other propagation medium vis a communication link (e.g., a modem or network connection).

Embodiments of the invention introduce a novel system for Kalman filtering for grid computing telemetry and workload management. FIG. 1 is a block diagram illustrating one embodiment of a grid computing topology. System 100 includes a client 110, a network 120, and a grid computing engine 130. Client 110 and grid computing engine 130 are communicatively coupled via network 120.

Grid computing engine 130 is a system that manages and schedules the allocation of distributed resources such as processors, memory, disk space, and software licenses. The grid computing engine 130 may be responsible for accepting, scheduling, dispatching, and managing the remote execution of large numbers of standalone, parallel, or interactive user jobs, such as those originating from client 110. Grid computing engine 130 further makes use of multiple advanced scheduling algorithms for powerful policy-based resource allocation.

Grid computing engine 130 may include multiple computing resources 135, such as individual computers, servers, or other computing engines that perform a task. These computing resources 135, or nodes, appear to user 110 as a single large computational resource. User 110 may submit a job to the grid computing engine 130 via network 120 and not be concerned about where the job is run.

Maintaining the multiple computing resources 135, or nodes, of grid computing engine 130 may be difficult. Any one node 135 may have a variety of measurements that may be tracked for resource management purposes. These measurements are also known as telemetry data. For example, telemetry data may include disk space, temperature, central processing unit (CPU) usage, transaction load, network input/output (I/O), and the like. One skilled in the art will appreciate the variety of measurements capable of being tracked as telemetry data.

In a grid computing system with a large number of nodes 135, the amount of telemetry data produced by the system becomes quite substantial. Eventually, the amount of telemetry data to be saved and analyzed becomes burdensome, inefficient, and costly.

Embodiments of the invention provide a way to process, in a real-time manner, these large amounts of telemetry data produced by a grid computing system without loss of the information. Kalman filers are utilized at each of the nodes of the grid computing system to recursively filter the telemetry data and analyze the filtered data on a real-time basis in order to predict error conditions.

Embodiments of the invention utilize an optimal linear estimator known as the Kalman filter. The Kalman filter is an optimal recursive data processing algorithm that estimates the state of a dynamic system from a series of incomplete and noisy measurements. In a recursive filter, only the estimated state from the previous time step and the current measurement are needed to compute the estimate for the current state. In this way, a Kalman filter does not require all previous data to be kept in storage and reprocessed every time a new measurement is taken. Kalman filters also have the desirable property of being able to predict future states and to characterize past states of a system based on measurements of the current state.

While Kalman filters incorporate concepts from control theory, probability, and linear systems, they basically behave by estimating the current state of a system being modeled and then predicting a future state based on the telemetry data being measured. The prediction of the future state incorporates an assumption of noise associated with the measurements (i.e., error variance). Then, the actual current state is compared to the predicted current state. Based on the analysis indicating the magnitude of difference between the current and predicted states, the model is adjusted (or not adjusted, if the prediction was accurate).

In some embodiments, the use of Kalman filters in a grid computing topology, such as the grid computing topology 100 of FIG. 1, facilitates the measuring, controlling, and managing of the grid computing systems. For instance, Kalman filters may be useful in the automated management of workload balancing across nodes of the grid computing system. A Kalman filter may model variables associated with a workload. When a monitored system becomes overloaded, the Kalman filter would flag a problem and either recommend to an operator that a workload be moved to another node and/or move the load to a node with available resources (i.e., a node for which the associated Kalman filter parameters are within control limits).

In some embodiments, Kalman filters may provide for fault monitoring. Kalman filters may be used to maintain self-correcting systems within tight bounds based on telemetry data. In this application, a Kalman filter may trigger an error when conditions are out of bounds (e.g., a CPU failure on a multi-way system). In addition, the Kalman filter may self-correct if the monitored events are amenable to automated correction (e.g., shifting load to an alternate node).

Furthermore, Kalman filters may provide for the reduction of telemetry data storage. Because a Kalman filter is recursive, it does not require storage of telemetry data. Consequently, telemetry data does not need to be saved once the state of the estimators is computed. This elimination of storage requirements reduces the cost and expenses associated with storage of large data sets, as are required for other non-recursive telemetry applications.

Figure 2:
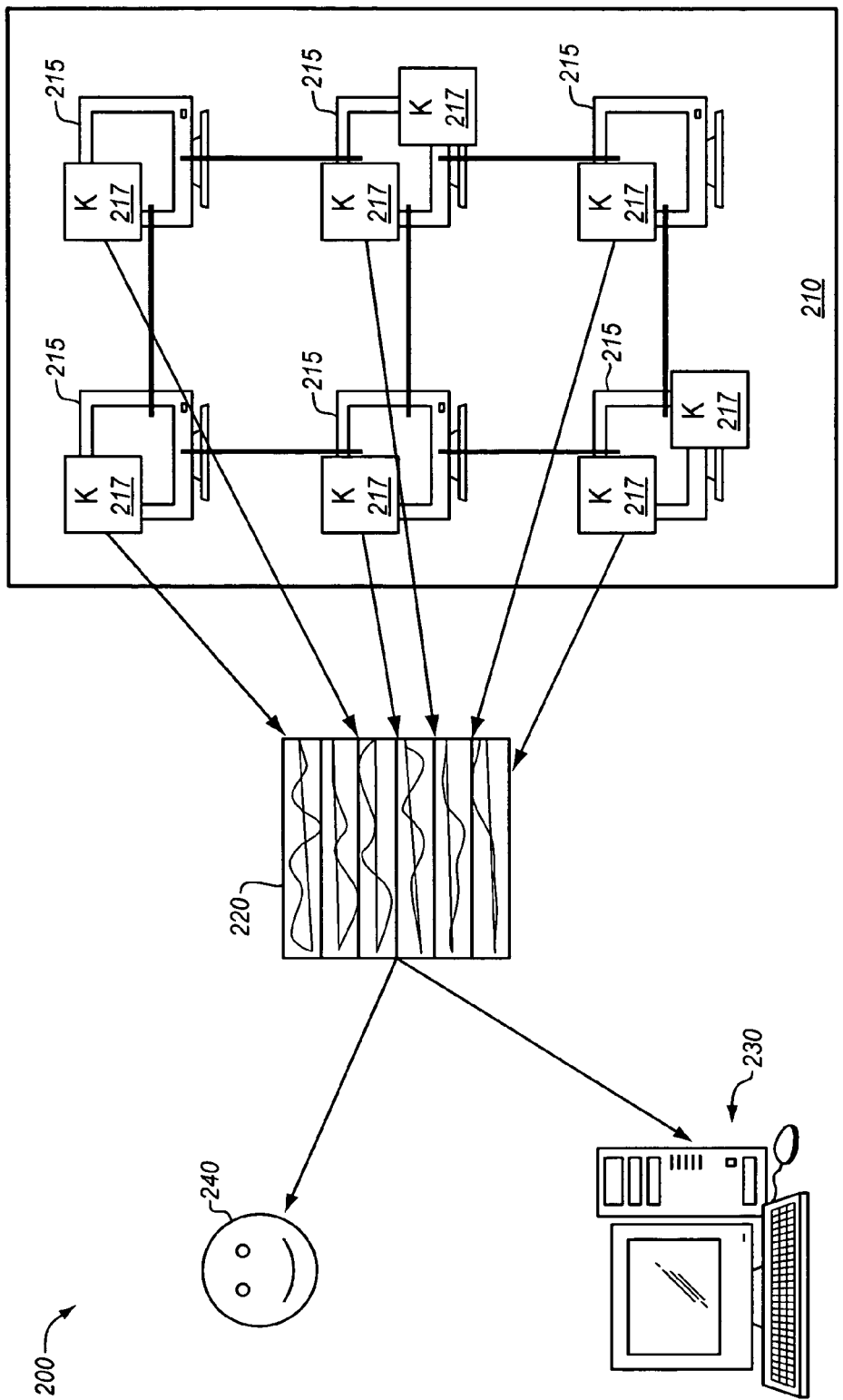
FIG. 2 is a block diagram illustrating one embodiment of a grid computing engine topology utilizing agent-based Kalman filters.

FIG. 2 is a block diagram of a grid computing topology utilizing agent-based Kalman filters for telemetry data according to one embodiment of the invention. Topology 200 includes a grid computing engine 210, a monitoring console 220, an automated response system 230, and a system administrator 240.

Grid computing engine 210 includes multiple computing nodes 215. In one embodiment, grid computing engine 210 may be the same as grid computing engine 130 described with respect to FIG. 1. As illustrated in FIG. 2, some embodiments of the invention may utilize one or more Kalman filters 217 within each individual computing node 215 of grid computing engine 210. Kalman filters 217 may measure various telemetry data produced by the computing nodes 215, such a disk space, temperature, CPU usage, transaction load, and network I/O, to name a few examples.

In one embodiment, an agent-based Kalman filter 217 at each computing node 215 may monitor, on a real-time basis a particular telemetry signal and filter out the data that is insignificant based on its modeling. There may be more than one Kalman filter 217 at a particular node 215. A Kalman filter 217 may run in real-time and indicate an error whenever telemetry data being monitoring is predicted to be out of bounds as compared to the Kalman filter's predictive model.

In one embodiment, each of the agent-based Kalman filters 217 may be connected to a monitoring console 220 that aggregates the real-time signals being generated by the various Kalman filters 217 of grid computing engine 210. When a Kalman filter 217 at a computing node 215 triggers an alarm condition, the monitoring console 220 may notify either or both of an automated response system 230 and a system administrator 240. In some embodiments, automated response system 230 may be programmed to self-correct specific error conditions with a pre-determined routine depending on the particular error. As its name suggests, the automated response system 230 may operate without human intervention in the handling of error conditions.

In other embodiments, system administrator 240 may be an actual person assigned to handle system errors. In some cases, monitoring console 220 may notify the system administrator 240 of an error condition via email or some other communication mechanism. In yet other embodiments, system administrator 240 may be physically monitoring the monitoring console 220 for the error conditions.

Figure 3:
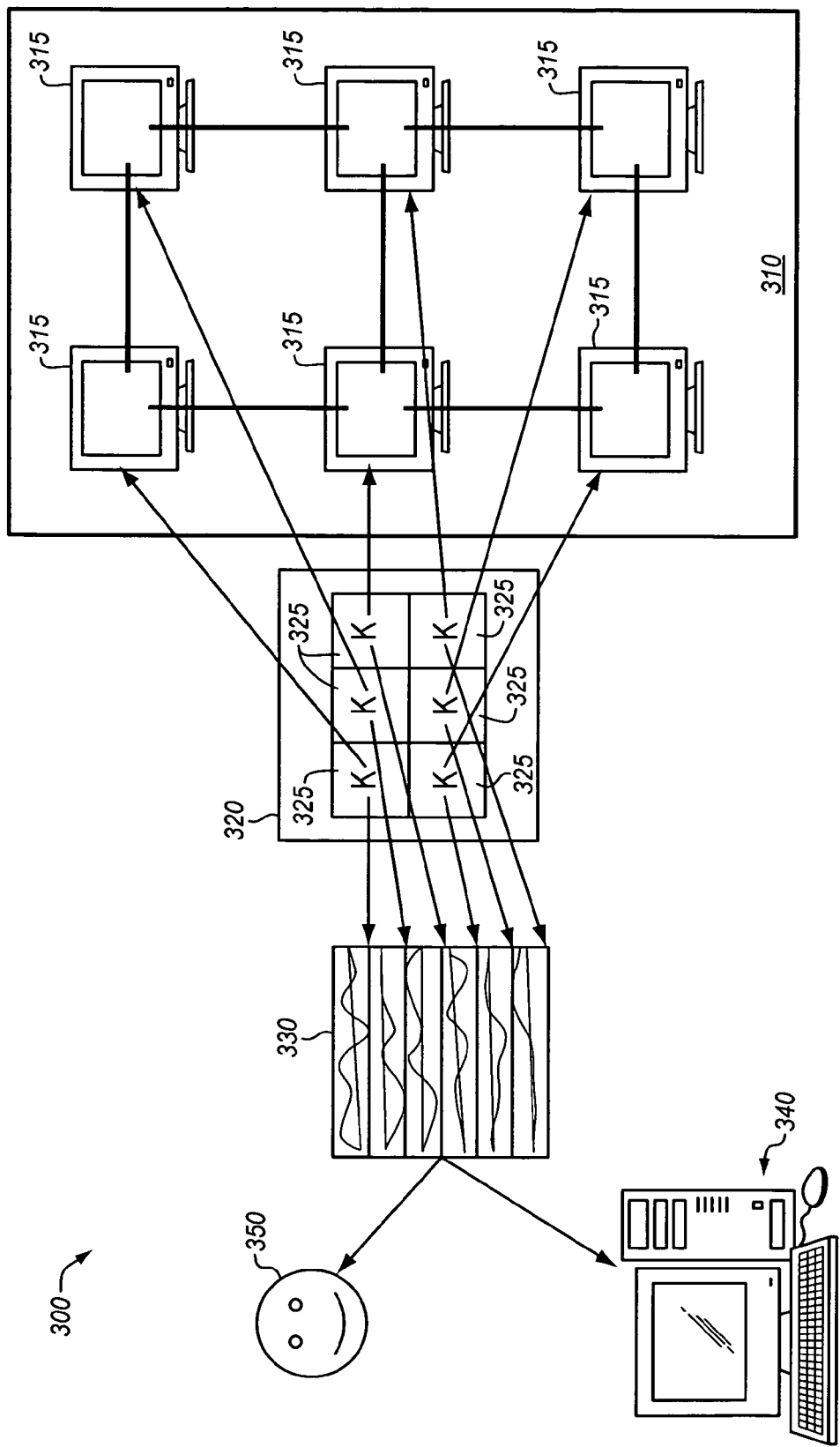
FIG. 3 is a block diagram illustrating one embodiments of a grid computing engine topology utilizing server-based Kalman filters.

FIG. 3 is a block diagram of a grid computing topology utilizing server-based Kalman filters for telemetry data according to another embodiment of the invention. Topology 300 includes a grid computing engine 310, a Kalman filter bank server 320, a monitoring console 330, an automated response system 340, and a system administrator 350.

Grid computing engine 310 includes multiple computing nodes 315. In one embodiment, grid computing engine 310 may be the same as grid computing engine 130 described with respect to FIG. 1. As illustrated in FIG. 3, some embodiments of the invention may utilize one or more Kalman filters 325, each corresponding to an individual computing node 315 of grid computing engine 210, located in a Kalman filter bank server 320. In some embodiments, more than one Kalman filter 325 may be associated with a single computing node 315.

In comparison to FIG. 2, Kalman filters 325 are combined in a single location at the Kalman filter bank server 320. Organizing the Kalman filters 325 in this server-based structure provides different management and maintenance advantages over an agent-based structure, such as that described with respect to FIG. 2.

In all other respects, Kalman filters 325 perform similarly to Kalman filters 217 described with respect to FIG. 2. For instance, Kalman filters 325 may measure various telemetry data produced by the computing nodes 315, such a disk space, temperature, CPU usage, transaction load, and network I/O, to name a few examples. They further monitor and predict error conditions from the telemetry data produced from their associated computing nodes 315. These errors are presented on monitoring console 330, and further reported out to either or both of automated response system 340 and system administrator 350. In one embodiment, monitoring console 330, automated response system 340, and system administrator 350 are the same as their counterparts described with respect to FIG. 2.

Figure 4:
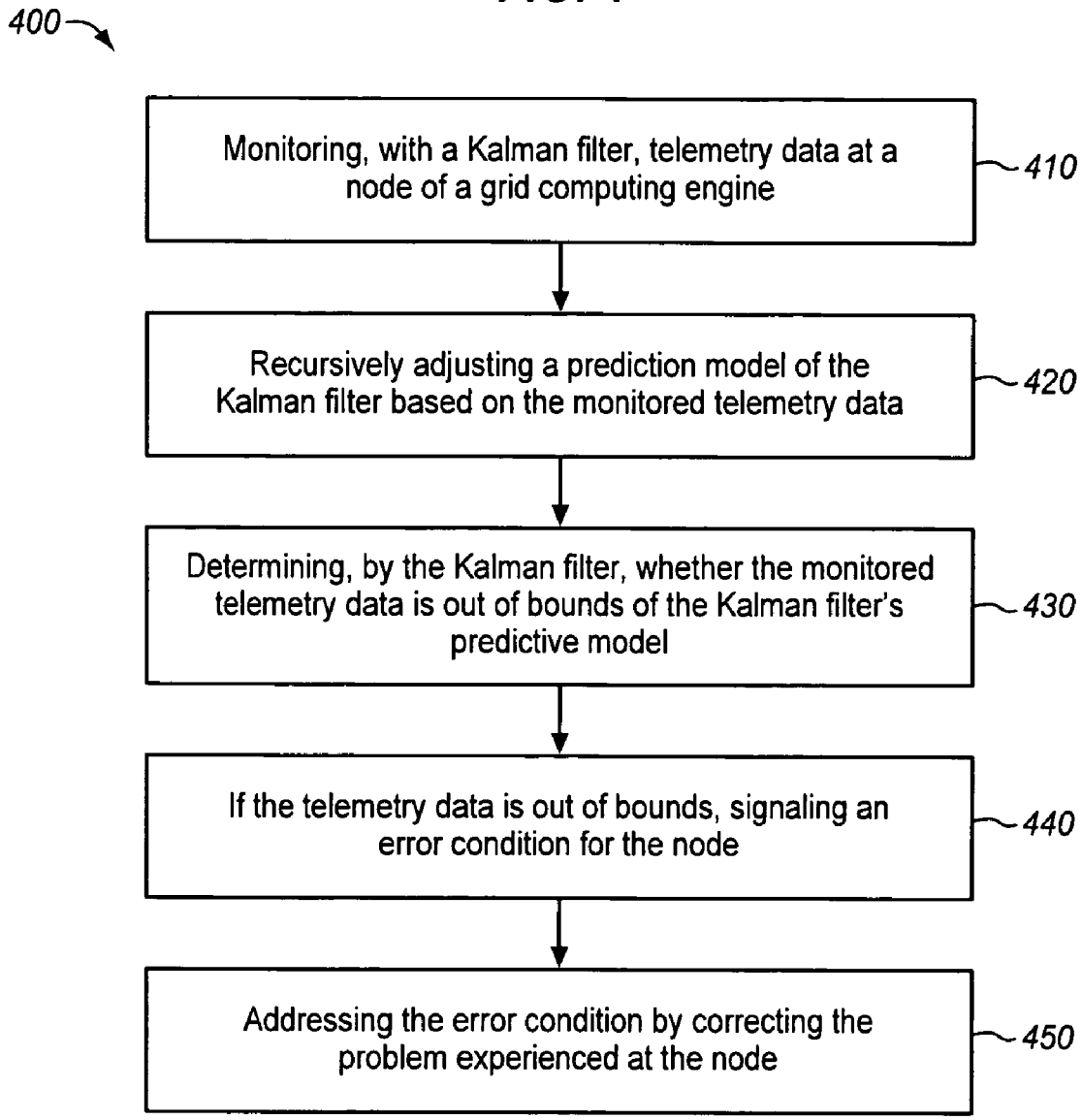
FIG. 4 is a flow diagram illustrating a method according to one embodiment of the invention.

FIG. 4 is a flow diagram depicting a method according to one embodiment of the invention. Process 400 describes a method for Kalman filtering for grid computing telemetry and workload management. In one embodiment, process 400 may be performed by either of systems 200 or 300 described with respect to FIGS. 2 and 3. Process 400 begins at processing block 410, where telemetry data at a node of a grid computing engine is monitored by a Kalman filter.

Then, at processing block 420, a prediction model of the Kalman filter is recursively adjusted based on the monitored telemetry data. At processing block 430, the Kalman filter determines whether the monitored telemetry data is out of bounds based on the Kalman filter's predictive model. If the telemetry data is out of bounds, then an error condition is signaled for the node at processing block 440. Finally, at processing block 450, the signaled error condition is addressed by correcting the problem associated with the error condition at the node in the grid computing engine.

Figure 5:
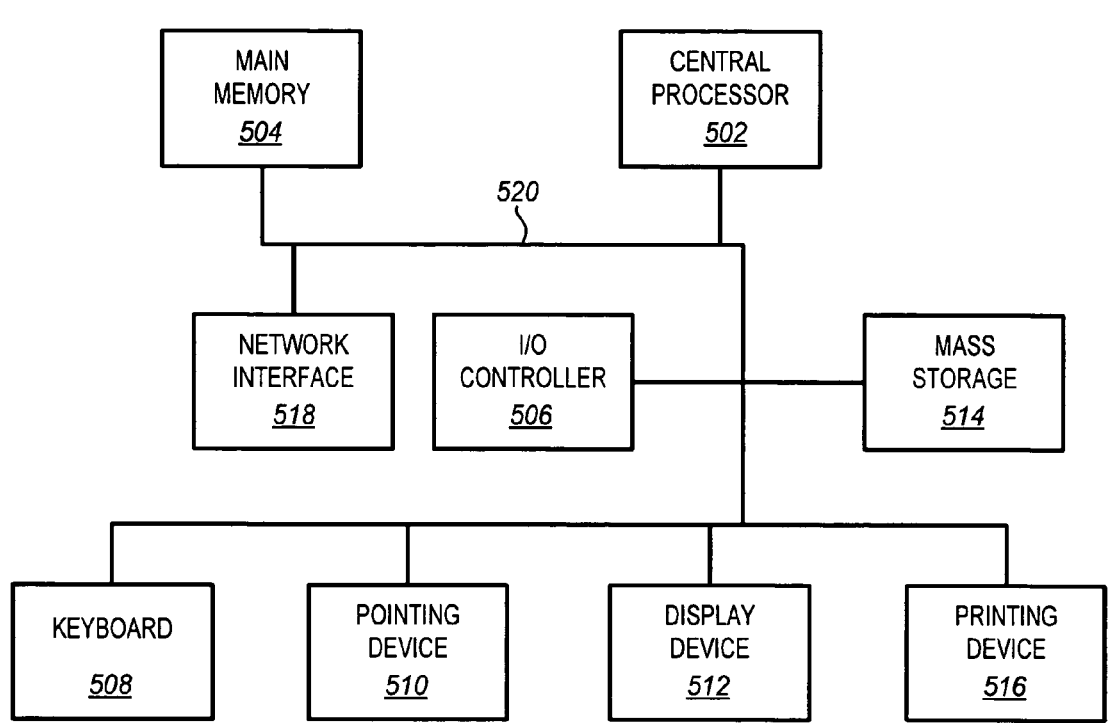
FIG. 5 is an illustration of an embodiment of a computer system.

FIG. 5 illustrates an exemplary computer system 500 in which certain embodiments of the present invention may be implemented. In one embodiment, the components of FIGS. 1 through 3 may be implemented as system 500 or as components of system 500.

System 500 comprises a central processor 502, a main memory 504, an input/output (I/O) controller 506, a keyboard 508, a pointing device 510 (e.g., mouse, track ball, pen device, or the like), a display device 512, a mass storage 514 (e.g., a nonvolatile storage such as a hard disk, an optical drive, and the like), and a network interface 518. Additional input/output devices, such as a printing device 516, may be included in the system 500 as desired. As illustrated, the various components of the system 500 communicate through a system bus 520 or similar architecture.

In a further embodiment, system 500 may be a distributed computing system. In other words, one or more of the various components of the system 500 may be located in a physically separate location than the other components of the system 500. Such components may be accessed and connected via a network to the other components In accordance with an embodiment of the present invention, the computer system 500 includes a Sun Microsystems computer utilizing a SPARC microprocessor available from several vendors (including Sun Microsystems, Inc., of Santa Clara, Calif.). Those with ordinary skill in the art understand, however, that any type of computer system may be utilized to embody the present invention, including those made by Hewlett Packard of Palo Alto, Calif., and IBM-compatible personal computers utilizing Intel microprocessor, which are available from several vendors (including IBM of Armonk, N.Y.).

Also, instead of a single processor, two or more processors (whether on a single chip or on separate chips) can be utilized to provide speedup in operations. It is further envisioned that the processor 502 may be a complex instruction set computer (CISC) microprocessor, a reduced instruction set computing (RISC) microprocessor, a very long instruction word (VLIW) microprocessor, a processor implementing a combination of instruction sets, and the like.

The network interface 518 provides communication capability with other computer systems on a same local network, on a different network connected via modems and the like to the present network, or to other computers across the Internet. In various embodiments of the present invention, the network interface 518 can be implemented utilizing technologies including, but not limited to, Ethernet, Fast Ethernet, Gigabit Ethernet (such as that covered by the Institute of Electrical and Electronics Engineers (IEEE) 801.1 standard), wide-area network (WAN), leased line (such as T1, T3, optical carrier 3 (OC3), and the like), analog modem, digital subscriber line (DSL and its varieties such as high bit-rate DSL (HDSL), integrated services digital network DSL (IDSL), and the like), cellular, wireless networks (such as those implemented by utilizing the wireless application protocol (WAP)), time division multiplexing (TDM), universal serial bus (USB and its varieties such as USB II), asynchronous transfer mode (ATM), satellite, cable modem, and/or FireWire.

Moreover, the computer system 500 may utilize operating systems such as Solaris, Windows (and its varieties such as CE, NT, 2000, XP, ME, and the like), HP-UX, IBM-AIX, PALM, UNIX, Berkeley software distribution (BSD) UNIX, Linux, Apple UNIX (AUX), Macintosh operating system (Mac OS) (including Mac OS X), and the like. Also, it is envisioned that in certain embodiments of the present invention, the computer system 500 is a general purpose computer capable of running any number of applications such as those available from companies including Oracle, Siebel, Unisys, Microsoft, and the like.

It should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

The foregoing description has been directed to specific embodiments. It will be apparent to those with ordinary skill in the art that modifications may be made to the described embodiments, with the attainment of all or some of the advantages. Therefore, it is the object of the appended claims to cover all such variations and modifications as come within the spirit and scope of the invention.

What is claimed is:

1. A method comprising:
    monitoring telemetry data at a node of a grid computing engine with a Kalman filter;
    determining whether the monitored telemetry data is outside of a bounds of a predictive model of the Kalman filter;
    signaling an error condition for the node if the monitored telemetry data is outside of the bounds; and
    addressing the error condition by correcting a problem experienced at the node corresponding to the error condition.

2. The method of claim 1, wherein the Kalman filter recursively adjusts the predictive model based on the monitored telemetry data.

3. The method of claim 1, wherein the determining whether the monitored telemetry data is outside of the bounds is performed in a real-time manner by the Kalman filter.

4. The method of claim 1, wherein the Kalman filter does not save the monitored telemetry data.

5. The method of claim 1, wherein the telemetry data includes at least one of a disk space of the node, a temperature of the node, a central processing unit (CPU) usage of the node, a transaction load of the node, and a network input/output (I/O) of the node.

6. The method of claim 5, wherein more than one Kalman filter each monitors a specific type of the telemetry data at the node.

7. The method of claim 6, further comprising utilizing a monitoring console to depict states of each of the more than one Kalman filter.

8. The method of claim 1, wherein the Kalman filter is located at the node.

9. The method of claim 1, wherein the Kalman filter is located at a server.

10. An article of manufacture, comprising a machine-readable storage medium including data that, when accessed by a machine, cause the machine to perform operations comprising:
    monitoring telemetry data at a node of a grid computing engine with a Kalman filter;
    determining whether the monitored telemetry data is outside of a bounds of a predictive model of the Kalman filter;
    signaling an error condition for the node if the monitored telemetry data is outside of the bounds; and
    addressing the error condition by correcting a problem experienced at the node corresponding to the error condition.

11. The article of manufacture of claim 10, wherein the Kalman filter recursively adjusts the predictive model based on the monitored telemetry data.

12. The article of manufacture of claim 10, wherein the determining whether the monitored telemetry data is outside of the bounds is performed by the Kalman filter in a real-time manner.

13. The article of manufacture of claim 10, wherein the telemetry data includes at least one of a disk space of the node, a temperature of the node, a central processing unit (CPU) usage of the node, a transaction load of the node, and a network input/output (I/O) of the node.

14. The article of manufacture of claim 10, wherein the Kalman filter is located at the node.

15. The article of manufacture of claim 10, wherein the Kalman filter is located at a server.

16. An apparatus, comprising:
    a grid computing engine having a node; and
    a Kalman filter associated with the node to:
        monitor telemetry data at the node;
        determine whether the monitored telemetry data is outside of the bounds of a predictive model of the Kalman filter; and
        signal an error condition for the node if the telemetry data is outside of the bounds.

17. The apparatus of claim 16, further comprising an automated response system to address the error condition by correcting a problem experienced at the node corresponding to the error condition.

18. The apparatus of claim 16, wherein the telemetry data includes at least one of a disk space of the node, a temperature of the node, a central processing unit (CPU) usage of the node, a transaction load of the node, and a network input/output (I/O) of the node.

19. The apparatus of claim 18, wherein the Kalman filter recursively adjusts the predictive model based on the monitored telemetry data.

20. The apparatus of claim 16, further comprising a monitoring console to depict a state of the Kalman filter.

* * * * *